United States Patent
Padamsee

[19]

[11] Patent Number: 6,140,614
[45] Date of Patent: Oct. 31, 2000

[54] ELECTRIC DRINKING CUP FOR VEHICLES

[75] Inventor: Riaz A. Padamsee, Durham, N.C.

[73] Assignee: Global Sales, Inc., Durham, N.C.

[21] Appl. No.: 09/426,682

[22] Filed: Oct. 25, 1999

[51] Int. Cl.[7] .............................. A47J 27/21; H05B 1/02
[52] U.S. Cl. .......................................... 219/438; 219/441
[58] Field of Search .................................. 219/385, 386,
219/387, 429, 432, 435, 436, 438, 441,
443; 222/146.5

[56] References Cited

U.S. PATENT DOCUMENTS

| | | | |
|---|---|---|---|
| 2,046,125 | 6/1936 | Lacy ......................................... | 219/436 |
| 3,807,194 | 4/1974 | Bond . | |
| 3,931,494 | 1/1976 | Fisher et al. . | |
| 4,095,090 | 6/1978 | Pianezza ................................. | 219/441 |
| 4,463,664 | 8/1984 | Peace ...................................... | 219/433 |
| 4,640,226 | 2/1987 | Liff ......................................... | 219/429 |
| 4,801,782 | 1/1989 | Ineson .................................... | 219/438 |
| 4,980,539 | 12/1990 | Walton ................................... | 219/432 |
| 4,983,814 | 1/1991 | Ohgushi . | |
| 5,243,684 | 9/1993 | Edwards ................................ | 219/436 |
| 5,283,420 | 2/1994 | Montalto ............................... | 219/432 |
| 5,337,984 | 8/1994 | Houck . | |
| 5,433,337 | 7/1995 | Willbrandt . | |
| 5,508,494 | 4/1996 | Sarris et al. ........................... | 219/386 |
| 5,573,139 | 11/1996 | Yeh . | |
| 5,605,089 | 2/1997 | Yu . | |
| 5,609,382 | 3/1997 | Schmid et al. . | |
| 5,685,480 | 11/1997 | Choi . | |
| 5,769,266 | 6/1998 | Willbrandt . | |
| 5,842,633 | 12/1998 | Nurse . | |
| 5,860,557 | 1/1999 | Willbrandt . | |
| 5,899,354 | 5/1999 | Garcia . | |
| 5,903,133 | 5/1999 | Amero . | |

*Primary Examiner*—Joseph Pelham
*Attorney, Agent, or Firm*—Olive & Olive, P.A

[57] ABSTRACT

An electric drinking cup for use while driving a vehicle comprised of a plastic inner liner, a metal outer shell, and an insulation-filled space therebetween. A heating element is associated with the bottom portion of the inner liner, and is electrically connected to a vehicle's electrical system. The plastic inner liner curves around the upper edge of the outer metal shell providing a cup lip, which does not get hot when containing a hot liquid. The plastic inner liner and heating element further provide a diffuse heat that heats liquid, such as coffee or hot chocolate, slowly to the desired temperature such that, when heated, the liquid does not become burned and distasteful. The outer metal shell provides durability.

16 Claims, 2 Drawing Sheets

ELECTRIC DRINKING CUP FOR VEHICLES

BACKGROUND OF THE INVENTION

1. Field of the Invention

This invention relates to drinking cups, in particular portable electric cups adapted to fit in standard vehicle cup holders and to electrically be connected to vehicle cigarette lighter sockets.

2. Background of the Prior Art

It is not unusual for people to drive their vehicles for one hour or more to commute to work, and some workers, such as truckers, drive many hours each day. Consequently, most vehicles contain receptacles which hold drinking cups and cans.

Coffee is a favorite beverage of people driving long distances. Most individuals drink from disposable coffee cups when traveling in a vehicle, which are typically made from styrofoam or cardboard. The disadvantage of disposable cups is that they are flimsy, often spilling their liquid. In addition, disposable cups do not provide adequate insulation between the hot liquid contained therein and a person's hand.

Non-disposable vehicle drinking cups have become popular. The non-disposable cups are more attractive than disposable cups, are much sturdier, and usually provide better insulation. Non-disposable vehicle cups are typically made from metal, plastic, or ceramics. The disadvantage of metal and ceramic cups is that they retain heat from the coffee. If a beverage, such as coffee, is very hot, the metal or ceramic cups can end up burning a person's hand and/or lips. Plastic, on the other hand, is not as strong as metal or attractive as ceramic, but is a better insulator.

Insulated cups are designed so that the exterior of the cup remains substantially at ambient temperature, while the temperature of the liquid contained therein remains above or below the ambient temperature for longer periods of time than liquid contained within cups that are not insulated. Insulated cups typically consist of inner and outer walls with an insulating space therebetween, and are formed of a single material, such as metal, plastic, or ceramics. Plastic insulated cups are popular because the drinking lip tends to be significantly cooler than the hot liquid contained in the cup, and is thus safe to drink from, especially while driving. Double walled metal cups, although sturdier and often more esthetically desirable (for example, stainless steel), absorb and retain more heat from the liquid contained in the cup than a similarly constructed plastic cup, and therefore, can potentially cause burns or at least make drinking from such a cup uncomfortable. The present invention recognizes the need to incorporate the advantages of plastic and metal into one cup.

The present invention also recognizes that hot beverages, such as coffee, contained in traditional non-disposable vehicle cups cool relatively quickly, even when contained in insulated vehicle cups. Therefore, there is a need to safely keep drinks hot during extended vehicular travel. Clearly, it is well known to combine a heating element and a liquid container to heat the liquid contained therein. Electric kettles are a good example. However, these liquid containers use metal inside walls to quickly transfer the heat from the heating elements to the liquid contained therein, and often incorporate an insulating plastic outer shell that can typically be touched during the liquid heating process without injury. Such a device is shown in U.S. Pat. No. 3,931,494 of Fisher. Plastic inner walls are not used in electric liquid containers because these containers are used to boil water, and the container's heating element can become hot enough to melt the plastic inner wall. In addition, a heating element used in association with a plastic inner wall would, compared to metal, take longer to boil water under similar heating conditions.

It is a general object of the present invention to provide an electric drinking cup for vehicles that safely keeps hot beverages, such as coffee, at a safe drinking temperature.

It is a further object of the present invention to use a plastic inner liner and an outer metal shell to form the body of the electric drinking cup of the invention, wherein the plastic inner liner is curved over the upper edge of the outer metal shell to form a safe drinking rim.

It is another object of the present invention to use a heating element, in association with the bottom portion of the plastic inner liner, to slowly heat the beverage therein to a safe drinking temperature.

SUMMARY OF THE INVENTION

The electric drinking cup for a vehicle of the present invention includes a plastic inner liner, an outer metal shell, and an insulation-filled space therebetween. A heating element is located within the insulation filled space and is wrapped around the lower portion of the plastic inner liner. The heating element is connectable to the electrical system of a vehicle. The plastic inner liner is curved over the upper edge of the outer metal shell to form a drinking rim that is safe to the touch when the cup contains a hot beverage. The combination of the heating element and plastic inner liner produces a diffuse slow heat that heats the coffee to a desired temperature, but does not burn the coffee, which typically occurs when using present electric liquid containers with metal inner liners. The outer metal shell imparts strength and durability to the cup, while the insulation-filled space prevents the metal shell from becoming warm to the touch.

DETAILED DESCRIPTION OF THE PREFERRED EMBODIMENT OF THE INVENTION

Figure 1:
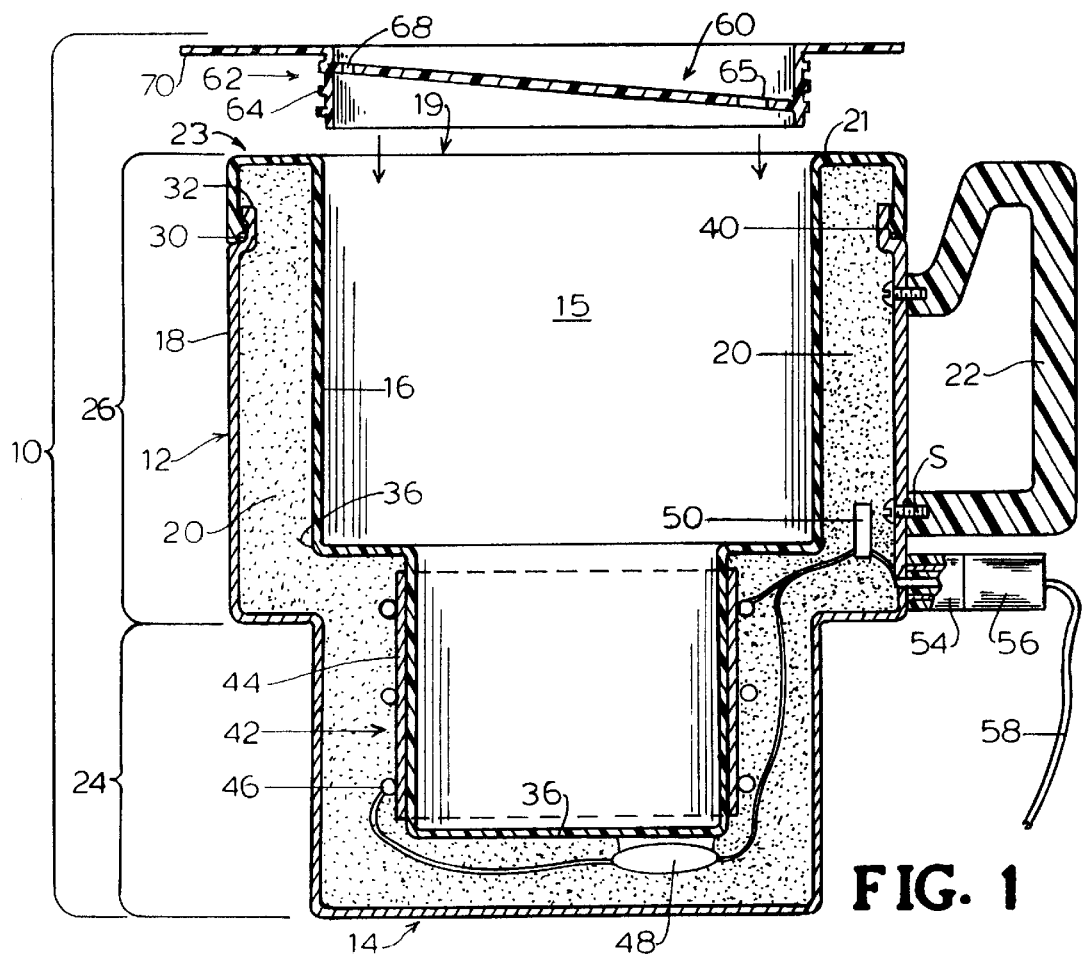
FIG. 1 is a side cross section view of the electrical vehicle cup of the present invention.

Referring to FIG. 1, a cross section of the first embodiment of the electric drinking cup 10 of the invention reveals substantially cylindrical side wall 12 and substantially flat base wall 14, each comprised of a plastic inner liner 16 and outer metal shell 18. Mouth 19, to interior volume 15, is defined by upper edge 21 of sidewall 12. Insulation-filled space 20 is shown filled with polyurethane foam. However, insulating materials other than polyurethane foam could be used, including air. Thus, the term "insulation filled space" refers to a space 20 filled with air or with standard insulating materials, such as polyurethane. Plastic inner liner 16 is shown curved around the upper edge of outer metal shell 18 to form a poor heat conductive plastic drinking rim 23, thereby protecting a drinker's lips from being burned while drinking hot liquid from the electric drinking cup 10 of the invention.

Referring again to FIG. 1, handle 22 is permanently attached to outer metal shell 18 by screws extending through outer metal shell 18 into threaded holes formed in the ends of handle 22. Cup 10 bottom portion 24 is formed to fit snuggly within a standard vehicle cup holder. In the preferred embodiment of the invention, top portion 26 has a diameter larger than bottom portion 24, thereby increasing the liquid capacity of the electric drinking cup 10 of the invention.

Outer metal shell 18 is formed with an outwardly facing channel 30 around its circumference and adjacent its upper edge 32. Plastic inner liner 16 includes an upper edge that is curved over the upper edge 32 of outer metal shell 18 to form drinking rim 23 as described above, and also includes an inward facing lip 40 that snaps into channel 30 as shown in FIG. 1, such that plastic inner liner 16 and outer metal shell 18 are secured together to prevent separation during long term use.

Still referring to FIG. 1, heating element 42 is comprised of a metal heat jacket 44 and heating coil 46 wrapped around the bottom portion 24 of insulation-exposed surface 36 of the plastic inner liner 16. FIG. 1 shows metal heat jacket 44, which can be made from any number of metals such as aluminum or copper, sandwiched between the insulation-exposed surface 36 and heating coil 46, to distribute the heat from heating coil 46 evenly around the bottom portion 24 of plastic inner liner 16. In the preferred embodiment, heating coil 46 is one continuous wire, wrapped around bottom portion 24 three times, and can be made from any metal wire with enough resistance to cause heating, such as aluminum, copper, or nickel. Metal heat jacket 44 also prevents direct contact between heating coil 46 and plastic inner liner 16.

Figure 2:
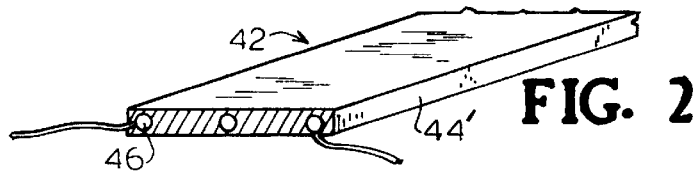
FIG. 2 is a perspective sectional view of a second embodiment of the heating element of the invention.

Referring to FIG. 2, heating element 42' can be formed into a single multi-layered unit comprised of heating coil 46' enclosed within a metal heat jacket 44', which can then be wrapped around lower portion 24 or otherwise placed in contact with lower portion 24.

Figure 3:
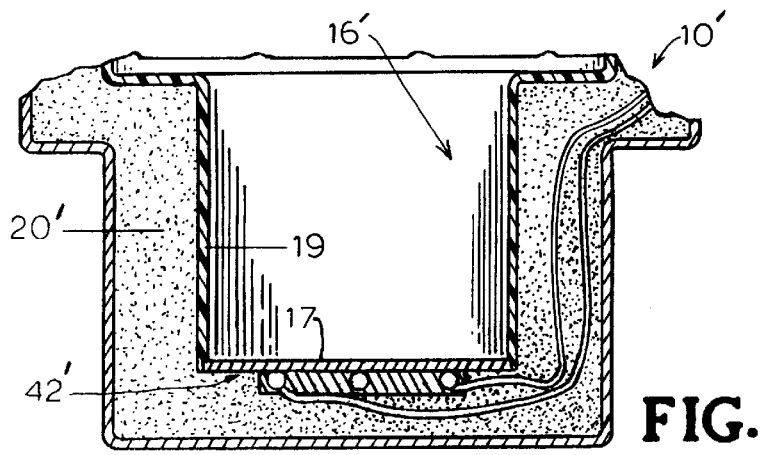
FIG. 3 is a side cross section view of a second embodiment of the invention showing a metal plate incorporated into the plastic inner liner and a heating element associated with the metal plate.

FIG. 3 shows a partial view of a second embodiment of the electric drinking cup 10' of the invention. Metal plate 17 is integrally molded into or otherwise formed with plastic inner liner 19 to form inner liner 16'. In the second embodiment, heating element 44' is positioned within insulation-filled space 20' against the bottom surface of metal plate 17.

Referring again to FIG. 1, the first embodiment of the electric drinking cup 10 of the invention includes thermostat 48 set against insulation exposed surface 36, but at a location remote from heating element 42. Thermostat 48 senses the temperature of the beverage. However, since thermostat 48 is not directly in contact with the beverage, there is a difference of approximately 5° F. between the temperature measured by thermostat 48 and the actual temperature of the hot beverage. In the preferred embodiment, when the beverage reaches 160° F., the thermostat disconnects the power to heating coil 46. When the temperature of the beverage drops below 155°, thermostat 48 connects the power to heating coil 46. These switching temperatures are well below the boiling point of 212° F., well below the temperature at which polyurethane foam insulation degrades (232° F.), and below the temperature at which most plastic melts. Thus, the present invention recognizes that for electric drinking cups, plastic inner liner 16 may safely be used instead of a traditional metal liner.

Safety fuse 50 is located in insulation-filled space 20 and electrically connected between heating element 42 and the electrical system of a vehicle (not shown), and is used to disconnect heating element 42 from the electrical system of the vehicle in the event of an electrical short. The electric vehicle-drinking cup 10 of the invention has a female plug 54 (socket) adapted to receive a male plug 56 assembled on the end of electrical cord 58, which leads to a vehicle's electrical system, typically plugging into the vehicle's cigarette lighter, as is well known in the art. Female plug 54 is specially located immediately beneath handle 22 and above base wall 14 so that electric cord 58 is safely kept away from a driver's lap and steering area when the driver is drinking from cup 10 of the invention. In addition, by placing female plug 54 directly underneath handle 22 and above base wall 14, electric cord 58 will not prevent bottom portion 24 of the invention from fully residing within a typical vehicle cup holder.

FIG. 1 also shows a molded lid 60 having a mouth engaging circumference 62 with integrally formed gaskets 64 formed to fit snuggly within mouth 19. Lid 60 has a drinking aperture 65 and an air release aperture 68 as is generally known. Tab 70 extends from the lid for easy removal of lid 60 from mouth 19.

Polyurethane foam is added prior to securing plastic inner liner 16 to outer metal shell 18. This is accomplished by partially inserting inner plastic liner 16 into outer metal shell 18 and then pouring a polyurethane chemical liquid mixture therebetween. The chemical mixture reacts and begins to foam. Plastic inner liner 16 and outer metal shell 18 are snapped together when the foam gets about halfway up the cup. There is a small air gap at the top interlock between plastic inner liner 16 and metal outer shell 18 that allows air to escape and the foam to fully occupy insulation-filled space 20. Heating element 42, heating coil 46, and thermostat 48 are mounted to insulation exposed surface 36 prior to securing plastic inner liner 16 to outer metal shell 18. Female plug 54 and safety fuse 50 are mounted to outer metal shell 18, also prior to inserting plastic inner liner 16 therein.

The advantages of the electric drinking cup 10 of the invention include plastic inner liner 16 that doesn't retain heat and won't burn a drinker's lips. In addition, the present invention combines plastic inner liner 16 with diffuse heating element 42 to create a slow heat that doesn't break down coffee or hot chocolate molecules, for example. Thus, electric drinking cup 10, of the present invention, can be plugged in all day and the hot liquids therein won't burn, as is common in most coffee percolators or other electric coffee makers. Furthermore, by using an outer metal shell 18, the electric vehicle cup 10 of the invention is as strong and durable as traditional metal cups.

Figure 4:
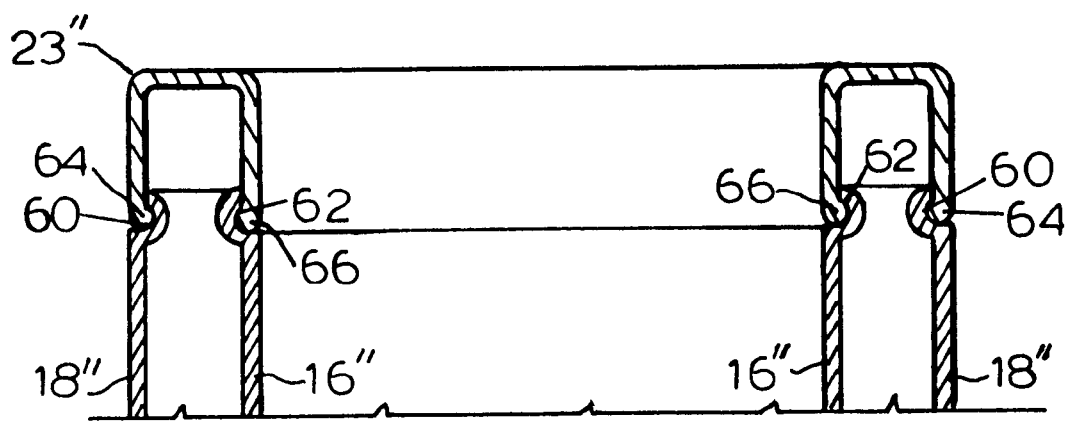
FIG. 4 is a cross sectional view of the lip portion of a third embodiment of the invention.

FIG. 4 illustrates the upper drinking lip portion of a third embodiment of the electric drinking cup 10" of the invention. Electric drinking cup 10" includes outer metal shell 18" and inner metal liner 16". Outer metal shell 18" is formed with an outwardly facing channel 60 around its circumference, and inner metal shell 16" is formed with an inwardly facing channel 62 around its circumference. Plastic drinking lip 23" of the third embodiment includes opposed lips 64 and 66 that snap into channels 60 and 62, respectively, such that metal outer shell 18" and metal inner layer 16" are secured together to prevent separation during long term use. Thus, in the third embodiment of the present invention, the poor heat conductive plastic drinking lip 23" protects a person's lips from being burned while drinking a hot beverage.

While the invention has been described with reference to specific embodiments thereof, it will be appreciated that numerous variations, modifications, and embodiments are possible, and accordingly, all such variations, modifications, and embodiments are to be regarded within the spirit and scope of the invention.

What is claimed is:

1. An electric drinking cup for use while driving a vehicle, comprising:

a) a side wall and a base wall comprised of a plastic inner liner, having a liquid exposed surface and an insulation-exposed surface, and an outer metal shell, an insulation-filled space located between said plastic inner liner and said outer metal shell, a liquid-receiving interior volume, and a mouth to said interior volume defined by an upper edge of said side wall, and b) a heating element in thermal contact with said insulation exposed surface of said plastic inner liner and electrically connectable to an electrical power source.

2. The electric drinking cup according to claim 1, wherein said heating element is comprised of a heat jacket wrapped around said insulation-exposed surface of a bottom portion of said plastic inner liner, and a heating coil wrapped around said heating jacket.

3. The electric drinking cup according to claim 1, further comprising a thermostat located within said insulation-filled space and in contact with said plastic inner liner, but at a sufficient distance away from said heating element so as to gauge the temperature of a beverage in said liquid receiving interior volume.

4. The electric drinking cup according to claim 1, wherein an upper portion of said sidewall has a greater diameter than that of a lower portion of said sidewall.

5. The electric drinking cup according to claim 1, further comprising a handle fixedly connected to said outer metal shell.

6. The electric drinking cup according to claim 5, further comprising a socket located immediately below said handle and above said lower portion for electrically connecting said heating coil to said electrical power source.

7. The electric drinking cup according to claim 1, wherein said heating element is comprised of a metal heat jacket enclosing a heating coil.

8. The electric drinking cup according to claim 1, further comprising a thermostat electrically connected to said heating element, whereby said thermostat disconnects power to said heating element when the beverage inside said drinking cup reaches approximately 160° F., and connects power to said heating element when the beverage inside said drinking cup reaches approximately 155° F.

9. The electric drinking cup according to claim 1, wherein said base and side walls are formed to fit within a vehicle cup holder.

10. The electric drinking cup according to claim 1, wherein said electric power source is comprised of a vehicle's electrical power system.

11. An electric drinking cup for use while driving a vehicle, comprising:

a) a side wall comprised of a plastic inner liner and an outer metal shell, a base wall comprised of inner metal plate and an outer metal shell, said inner metal plate being integrally formed with said plastic inner liner to form an inner liner having an insulation-exposed surface, an insulation-filled space between said inner liner and said outer metal shell, a liquid-receiving interior volume, and a mouth to said interior volume defined by an upper edge of said side wall, wherein said base and side walls are formed to fit within a vehicle cup holder; and b) a heating element located within said insulation-filled space adjacent said inner metal plate and electrically connected to the electrical system of a vehicle.

12. The electric drinking cup according to claim 11, wherein said heating element is comprised of a heat jacket in contact with said inner metal plate and a heating coil in contact with said heat jacket.

13. The electric drinking cup according to claim 11, further comprising a thermostat located within said insulation-filled space and in contact with the insulation-exposed surface of said plastic inner liner at a sufficient distance away from said heating element so as to gauge the temperature of a beverage in said liquid receiving interior volume.

14. The electric drinking cup according to claim 11, wherein the upper portion of said sidewall has an overall greater diameter than that of the lower portion of said sidewall.

15. The electric drinking cup according to claim 11, further comprising a handle fixedly connected to said outer metal shell.

16. The electric drinking cup according to claim 15, further comprising a socket located immediately below said handle and above said lower portion for electrically connecting said heating coil to said vehicle electrical system.

* * * * *